United States Patent [19]
Briggs

[11] Patent Number: 5,355,696
[45] Date of Patent: Oct. 18, 1994

[54] POLLUTION CONTROL APPARATUS FOR INDUSTRIAL PROCESSES AND THE LIKE

[76] Inventor: Aubrey C. Briggs, 305 Summer Dr., Coraopolis, Pa. 15108

[21] Appl. No.: 23,785

[22] Filed: Feb. 22, 1993

Related U.S. Application Data

[63] Continuation of Ser. No. 910,937, Jul. 9, 1992.

[51] Int. Cl.5 .............................................. B01D 47/00
[52] U.S. Cl. ..................................... 62/476; 62/238.3; 62/259.1; 261/DIG. 9
[58] Field of Search ................... 62/476, 238.3, 259.1; 261/127, 140.2, DIG. 9

[56] References Cited

U.S. PATENT DOCUMENTS

| | | | |
|---|---|---|---|
| 1,932,076 | 10/1933 | Kemmer | 62/238.3 |
| 2,803,450 | 8/1957 | McFeaters | 266/13 |
| 5,135,723 | 8/1992 | Fuller | 422/184 |
| 5,145,498 | 9/1992 | Houston | 55/222 |

*Primary Examiner*—Henry A. Bennet
*Assistant Examiner*—Willian C. Doerrler
*Attorney, Agent, or Firm*—Walter J. Blenko, Jr.

[57] ABSTRACT

The specification discloses pollution control equipment for pollution generating industrial processes. A containment structure confines pollutants within the structure from which they are removed by cleaning equipment. An absorption refrigeration system removes heat from containment structure for co-generation.

15 Claims, 3 Drawing Sheets

POLLUTION CONTROL APPARATUS FOR INDUSTRIAL PROCESSES AND THE LIKE

This application is in part a continuation of my copending application Ser. No. 910,937 filed Jul. 9, 1992.

This invention relates to control of pollution and emissions from industrial processes. More particularly, this invention relates to apparatus which generates heat and emissions which are trapped in a containment building and which are extracted from the atmosphere within the containment building.

Certain processes are well known to produce substantial quantities of heat and also particulate and gaseous emission. Such processes are common in the metals industries and include equipment such as top-blown oxygen converters and by-product coke ovens.

Coke ovens have been particularly difficult to operate in compliance with existing environmental regulations. Substantial amounts of heat are evolved in the operation of a coke oven. Problems of emissions and atmospheric pollution arise when incandescent coke is pushed from an oven into a quench car, when the incandescent coke is quenched, and when tars are burned off the oven door seals to permit a tight fit to be maintained when the oven is recharged with coking coal. Despite ongoing and diligent efforts to resolve pollution problems, pollution control continues to be a major effort in coke oven operation.

I have invented new and useful improvements in pollution control apparatus for industrial processes and the like. I provide a containment structure enclosing the processing equipment and including a barrier to isolate the equipment from the atmosphere. I further provide gas-cleaning apparatus having an intake and a discharge within the containment structure. I further provide refrigeration apparatus in which an evaporator is positioned in heat exchange relationship with the atmosphere within the containment structure and a refrigeration condenser is positioned in heat exchange relationship with a heat receiving medium outside the containment structure. Preferably, I provide an absorption refrigeration system having a generator in heat exchange relationship with hot gases within the containment structure and which is activated by heat generated by the processing equipment. Preferably, I position the refrigeration evaporator adjacent to the wall of the containment structure. I may incorporate the evaporator within the containment structure as by a series of interconnected passages.

In one form of my invention, I place the refrigeration generator at a location within the containment structure where temperature differentiales within the containment structure will tend to cause flow of hot gases toward the generator.

Other details, objects, and advantages of my invention will become more apparent as the following description of the present preferred embodiment thereof proceeds.

In the accompanying drawing, I have illustrated pollution control apparatus embodying my invention in perspective in which.

Figure 1:
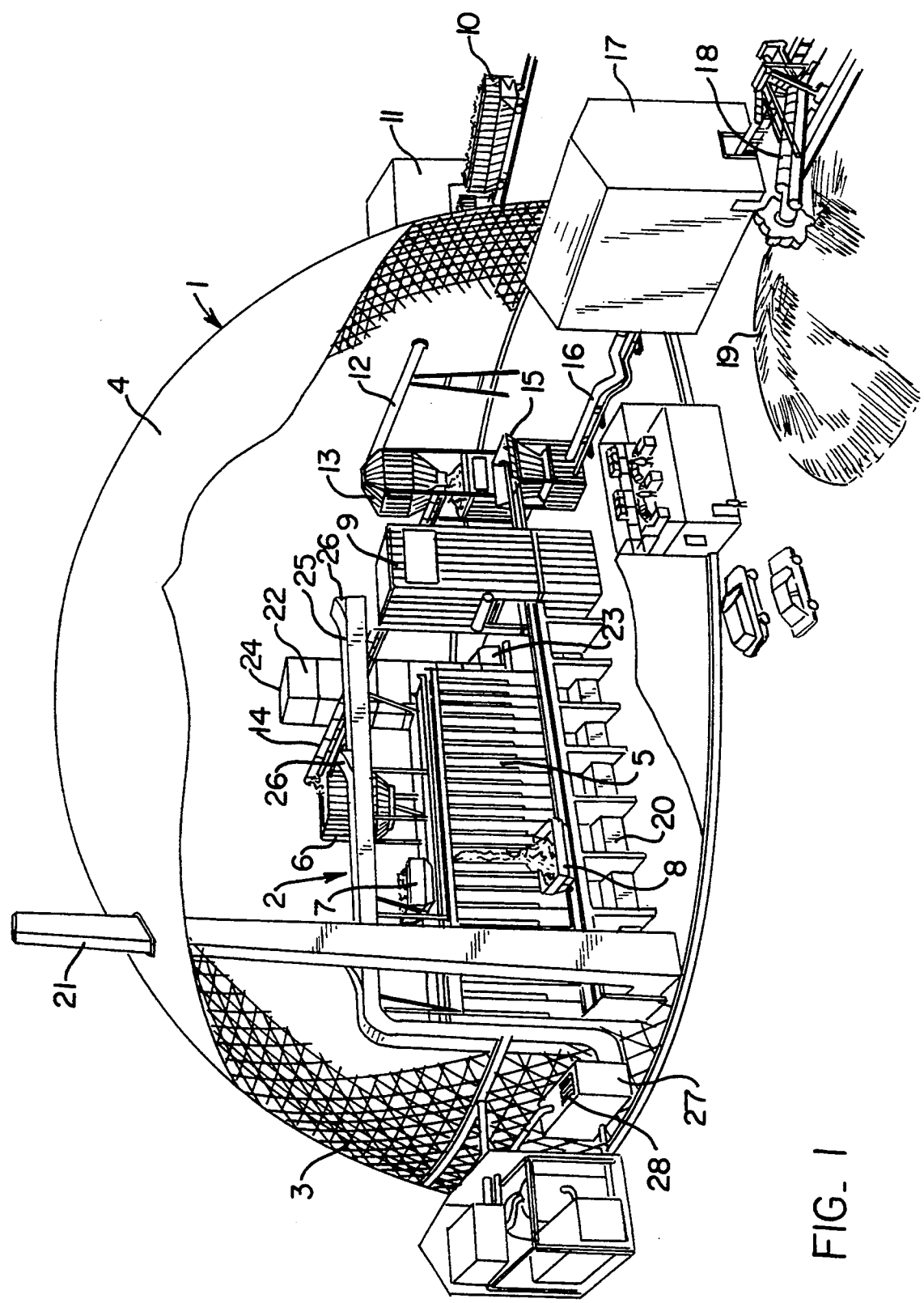
FIG. 1 is a perspective view of an installation incorporating my invention for use in handling coke oven emissions.

FIG. 1 shows a containment structure in the form of a large dome 1 is positioned around a coke oven battery 2 of conventional design. The dome comprises an interconnecting lattice work of hollow tubes 3 having an impervious covering 4 which acts as a barrier separating the atmosphere within the dome from the surrounding atmosphere.

To provide the heat necessary to roast the coal, a combustion system is provided within the dome. Although the coking chambers and the combustion chambers share space under the dome, there is no interchange of atmosphere between the systems. Heat only flows through the furnace walls to the coke oven. Because coal is taken into the dome and coke and other products are taken out of the dome by self-sealing transportation systems, it is possible to hermetically seal the containment building. In practice, it will be necessary to open the sealed building to allow access for maintenance personnel. However, an efficient locking system will ensure a minimum of leakage in either direction.

The coke oven battery includes a series of ovens 5, a coal storage bin 6, and a larry car 7 mounted on top of the ovens for transfer of coal from the storage bin to the individual ovens. A quench car 8 is provided to transfer hot coke after pushing from an oven to a quenching tower 9. Coking coal is delivered to the plant by rail cars 10 which are unloaded at transfer point 11. The coal is converted to a water slurry which is transported into the containment structure through a pipe 12 and is dumped into a dewatering hopper 13. Dewatered coal passes through a conveyor 14 to storage bin 6.

A receiving hopper 15 is positioned to receive quenched coke from quenching station 9. A hydro-transport system 16, which includes a water trap, leads from hopper 15 to a handling building 17 where the coke is dewatered. Dewatered coke is taken from building 17 by a conveyor 18 and is deposited on a storage pile 19.

The coke ovens are fired in the usual manner employing coke oven gas, blast furnace gas, or the like. Combustion air is supplied from outside dome 1 through a duct which is not shown. Air and fuel gas are burned and are used to heat the coal within the ovens. The combustion products are collected in a main 20 which vents to the atmosphere through a chimney 21 which extends through the wall of containment structure 1 into the outside atmosphere. Because the combustion system is not connected to the space inside the dome, there is no transfer of pollutants enclosed by the dome to the outside.

A large volume of particulate matter and gases are evolved from the coking process. The atmosphere within the containment structure is continuously recirculated through an air scrubber 22 having an intake 23 and a discharge 24. Materials removed from the recirculating atmosphere inside the containment structure as well as the coke products are removed from the containment structure by a hydro-transport system having a water seal or other suitable barrier to prevent gas flow between the outside and the inside of the containment structure. Since there is no passage of air into or out of the dome the air within will quickly become oxygen-starved as the oxygen content of the air is consumed. Provided that any make up volume is in the form of an inert gas it is possible to dry quench the coke by blowing the contained atmosphere through the coke.

A hot gas duct 25 is mounted on the top of the coke oven battery and has a plurality of hot gas intakes 26 mounted above the quenching area. The duct extends to a casing 27 which has an induced draft fan mounted in it and a discharge 28.

Figure 2:
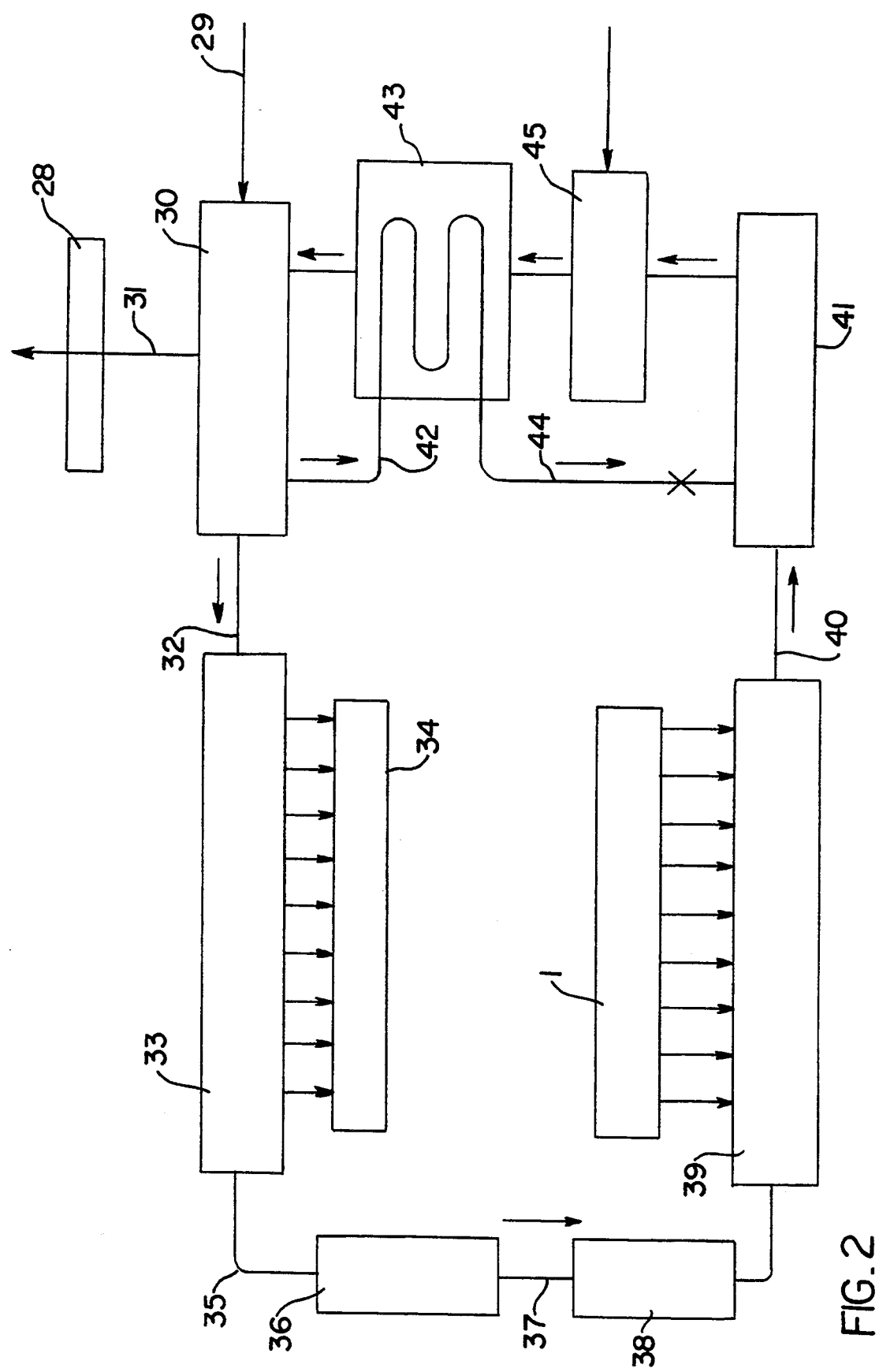
FIG. 2 is a diagrammatic view of a refrigeration system used in the installation shown in FIG. 1.

The refrigeration system is shown in diagrammatic form in FIG. 2. Hot gases flowing in duct 25 is represented by reference number 29. The hot gases pass through generator 30 of the refrigeration system and leave, after giving up heat, as a cooler stream 31 which passes through discharge 28 into the dome. The generator contains a mixture of water and ammonia. Heating of the mixture drives ammonia vapor through conduit 32 to a condenser 33 where heat is extracted from the ammonia and the ammonia is condensed to a liquid. The heat is delivered to a heat sink 34 which may be in the form of hot water or steam which is then used for space heating or other form of co-generation. The cooled ammonia then passes through a conduit 35 to a reservoir 36 and through a conduit 37 to an expansion valve 38 and then to an evaporator 39. In the structure shown in FIG. 1, the hollow latticework structure 3 serves as the evaporator and absorbs heat from the surrounding structure and the atmosphere within the dome. Alternatively, the refrigerant may be used to cool only a selected and controlled part of the latticework. Flow of heat is shown by the arrows extending from dome 1 to evaporator 39. Refrigerant warmed in evaporator 39 passes through a conduit 40 to an absorber 41. A weak ammonia-water solution leaves generator 30 through a conduit 42, passes through a heat exchanger 43 and a conduit 44 to absorber 41 where it mixes with the ammonia returning from evaporator 39. The water-ammonia mixture from the absorber is pumped by a pump 45 through heat exchanger 43 where it absorbs heat from the weak solution and is returned to the generator.

Figure 3:
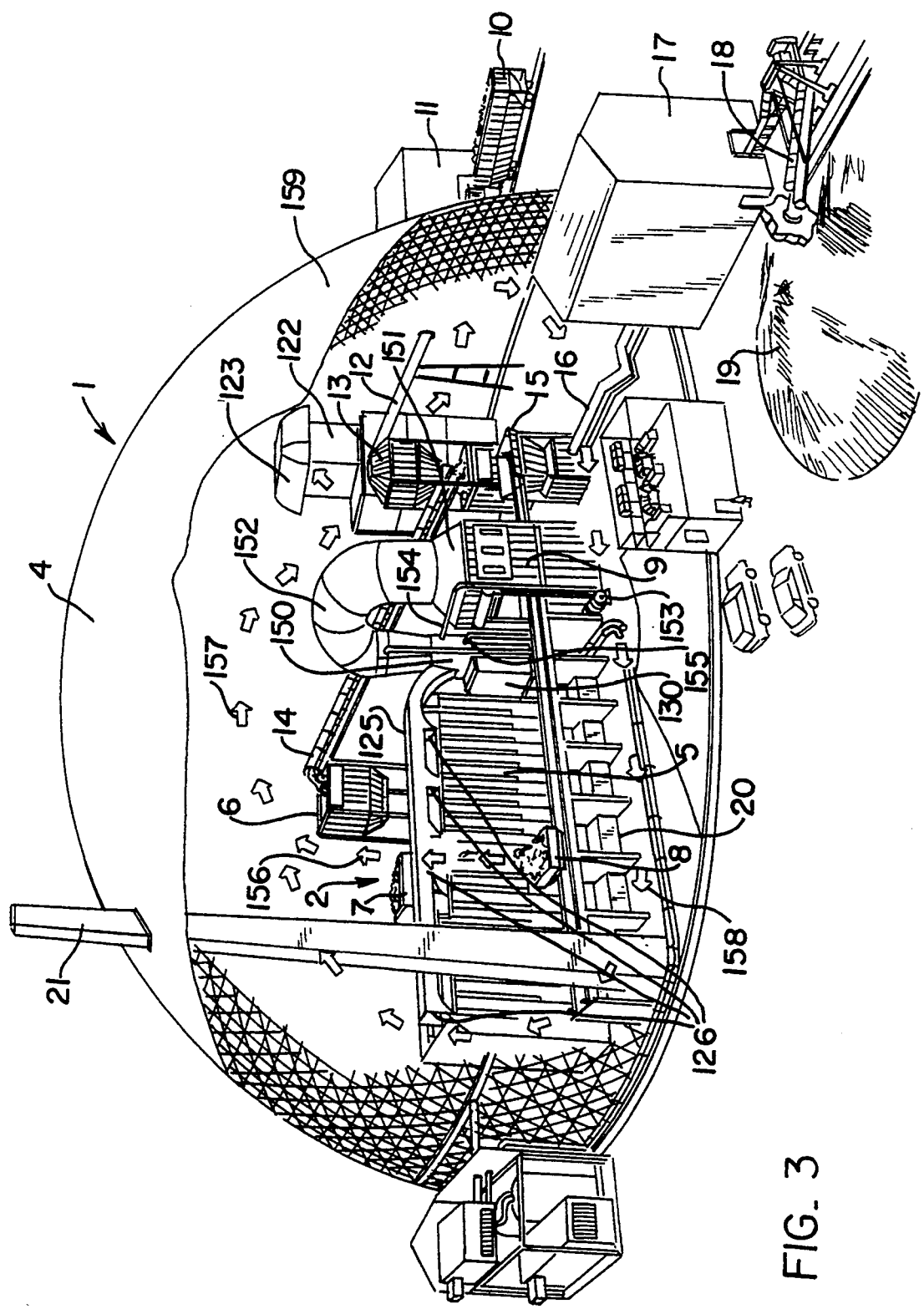
FIG. 3 is an installation similar to that shown in FIG. 1 in which the generator is positioned in a stream of hot gases created in whole or in part by temperature differentials within the containment structure.

A modified form of the invention is show in FIG. 3. The structure is similar to the structure shown in FIG. 1 and like parts are identified by like numbers. A generator 130 is positioned at a central point within tile containment structure. A hot gas duct 125 is mounted on the top of the coke oven battery and has a plurality of hot gas intakes 126 mounted above the quenching area. Duct 125 leads to a plenum 150 which is mounted on top of generator 130. A hot gas collector 151 is mounted above quenching tower 9, and a hot gas duct 152 leads from collector 151 to plenum 150.

An air scrubber 122 has an air intake 123 mounted on top. Scrubbed air is discharged near the bottom of the scrubber.

A circulating water system is provided to circulate hot water in the bottom of the quench tower to a heat exchanger (not shown) in plenum 150. The circulating system includes a pump 152 which takes hot water from a sump in the bottom of quenching tower 9, a delivery line 153 leading from the pum to the heat exchange, and a return line 154 from the heat exchanger back to the sump.

In operation of the embodiment shown in FIGS. 1 and 2, coke and coal are delivered to transfer point 11 by rail cars 10. The coal is mixed with water to form a slurry at the transfer point. The slurry is pumped through pipe 12 to dewatering bin 13. The pumping apparatus for the slurry serves as an air lock and prevents passage of gases from the interior of dome 1 to the external atmosphere. Water is drained from the coal particles in dewatering bin by screening. The dewatered coal is carried from the bottom of bin 13 by conveyor 14 and deposited in a storage bin 6. A drying station may also be included so that the coal is dried n addition to being dewatered before it is delivered to storage bin 6. Coal within storage bin 6 is delivered by larry car 7 to the individual coke ovens at appropriate times in the coking cycle for each oven.

When the coking process is complete, coke is pushed from the oven by a pusher of conventional type (not shown) into a quench car 8. The incandescent coke is then carried to quenching station 9 where it is sprayed with a controlled amount of water to reduce the temperature below the combustion temperature.

Fuel gas, such as blast furnace gas or coke oven gas, is used to fire the coke ovens. The products of combustion travel through conduit 20 and up chimney 21 passing through dome 1 and exhausting into the atmosphere. The operation of the coke ovens is conventional and is well understood by those knowledgeable of coke oven installations.

The quenching of the hot coke and leakage from the coke ovens causes pollutants to be discharged into the space enclosed by dome 1. The air within dome 1 is continuously circulated through an air scrubber 22. The air is taken in at inlet 23 and discharged into the top of the dome through discharge 24. Pollutants are removed from the circulating air in the scrubber and are removed from the dome using a hydro transport system which is omitted from the drawings for clarity of illustration.

If quenching is done with a liquid, a substantial amount of water vapor will be emitted from the quenching tower. As the vapor rises and cools it will condense and produce "rain" within the dome. To eliminate that effect a refrigeration evaporator may be fitted to the cooling tower to cool the exiting gases enough to condense water vapor from the atmosphere and convert it to liquid form. The evaporator may be driven by and form a part of the system shown in FIG. 2.

The air within the dome is circulated through a system comprising a duct 25 and a casing 27. The generator 30 of the absorption refrigeration system is placed within casing 27. As air circulates through and past the generator, heat is transferred from the air to the generator causing the air temperature to be lowered and the fluid within the absorber to be heated. The heated refrigerant is then passed through a conduit to the outside of dome 1 where it is introduced into a condenser, and heat is extracted from the refrigerant. Preferably, the heat is collected and is used for a co-generation process. The heat may, however, be discharged into the atmosphere outside dome 1. The cooled refrigerant is then delivered to the lattice work 3 comprising hollow tubes where it is expanded causing a cooling of the lattice work and removing heat from the air within dome 1.

Instead of discharging heat to the atmosphere from condenser 29, the waste heat may be collected and used as energy to operate a space heating system or other processes. The use of the absorption refrigeration system permits the structure to be maintained at a safe working temperature using the available heat from the coking process. Further, the refrigeration cycle acts to remove heat from the dome without transfer of any pollutants from inside the dome to the atmosphere.

In the embodiment of the invention shown in FIG. 3, the generator and scrubber are relocated to take advantage of gaseous circulation within the containment structure resulting from temperature differentials. Heat is added to the atmosphere within the structure by radiation and convection from the coke oven battery and from each mass of hot coke pushed into larry car 8. Heat from the battery generally heats the atmosphere in the upper part of dome 1. Heat released by hot coke pushed into larry car 8 rises as a current of hot gas 155 and merges with heated but cooler gases in the upper part of the dome. The wall section 159 on the side of scrubber 122 opposite from the coke battery is selectively cooled. The rest of the dome is uncooled or is cooled only enough to avoid heat damage to the dome. The localized cooling at wall section 159 causes cooling of the gas adjacent the wall, which renders the gas more dense and causes the gas to settle to the bottom of the enclosed space. A circulation of gas in the dome is thereby brought about, the gas stream moving down past wall section 159, across the bottom of the enclosed space as a stream 158 which then rises to the top of the dome on the opposite side.

The mixture of heated gases in the upper part of the dome is induced to move in stream 157 toward intake 123 of scrubber 124. Scrubbing is done with wash water which also cools the gas. The cooled gas travels across the floor of the structure in a stream 158 which is driven by the thermal gradient to rise to the upper part of the dome. Thus, the addition of heat and extraction of heat tends to cause a circulation within the dome.

When the larry car with a load of hot coke enters quench tower 152, a measured amount of water is sprayed onto the incandescent coke and is converted to steam. The hot steam is conducted by collector 151 and duct 152 to plenum 150. Also, hot gas at the top of the ovens is conducted to plenum 150 by duct 125 from intakes 126. Heat in the hot gas is transferred to the refrigerant, and the hot gas is thereby cooled. The cooled gas is discharged into the bottom of the enclosed space to join stream 158.

Hot water from the sump in the cooling tower may be pumped to a heat exchanger at the generator for transfer of additional heat to the refrigerant in generator 130.

Fans may be provided optionally in scrubber 122, or ducts 125 and 152, or generator 130 to assist in moving the gases in the pattern described above.

While I have illustrated and described a present preferred embodiment of my invention, it is to be understood that I do not limit myself thereto, and that the invention may be otherwise variously practiced within the scope of the following claims.

I claim:

1. Pollution control apparatus for industrial processing equipment which generates large quantities of heated gases carrying pollutants which apparatus comprises:
   (a) a containment structure which encloses the processing equipment and which includes a barrier interposed between the processing equipment and the atmosphere,
   (b) gas cleaning apparatus having an intake and a discharge within the structure, and
   (c) an absorption refrigeration system having
       (i) a generator in heat exchange relationship with hot gasses within the structure and activated by heat generated by the processing equipment,
       (ii) a condenser positioned in heat exchange relationship with a medium outside the structure
       (iii) an evaporator positioned in heat exchange relationship with the atmosphere within the containment structure.

2. The apparatus of claim 1 in which a localized portion of the containment structure is cooled whereby a circulation of gases in the containment structure is induced by the resulting thermal gradient.

3. The apparatus of claim 1 in which the containment structure comprises a latticework of connected members.

4. The apparatus of claim 1 in which the industrial processing equipment is a coke oven battery.

5. The apparatus of claim 1 in which a combustion system heats the coke ovens and is separated from the atmosphere within the containment structure.

6. The apparatus of claim 1 in which reject heat from the refrigeration condenser is used for co-generation.

7. The apparatus of claim 1 in which the refrigeration system is used in part to cool a Selected gas flow within the containment building.

8. Pollution control apparatus for industrial processing equipment which generates large quantities of heated gases carrying pollutants which apparatus comprises:
   (a) a containment structure which encloses the processing equipment and which includes a barrier interposed between the processing equipment and the atmosphere,
   (b) a chilled zone in the containment structure,
   (c) gas cleaning apparatus having an intake and a discharge within the structure and interposed between the heat generating source and the chilled zone, the intake being above the discharge whereby gas cooled in the gas cleaning apparatus is discharged toward the lower part of the enclosed space, and
   (c) an absorption refrigeration system having
       (i) a generator positioned within the containment structure and having a gas intake and a gas discharge within the structure, the intake being above the discharge, whereby gas cooled in the generator is discharged toward the lower part of the enclosed space,
       (ii) a condenser positioned in heat exchange relationship with a medium outside the structure
       (iii) an evaporator positioned in heat exchange relationship with the atmosphere within the containment structure.

9. The process of collecting pollutants produced by a process that generates hot gases carrying pollutants, which comprises
   (a) collecting the hot gases within a containment structure which separates the hot gases from the atmosphere,
   (b) passing the hot gases through gas cleaning apparatus in flow relationship to the inside of the containment structure and separating pollutants from the hot gases,
   (c) removing separated pollutants from the containment structure,
   (d) providing an absorption refrigeration system comprising a generator, a condenser, an evaporator positioned in heat exchange relationship to the containment structure, and a refrigerant which circulates therethrough,
   (e) passing the hot gases through the generator of the refrigeration system, (f) passing a cooling medium through the condenser of the refrigeration system, (g) passing chilled refrigerant through the evaporator of the refrigeration system whereby the containment structure is maintained at a safe working temperature.

10. The process of claim 9 in which the gasses within the structure are cooled by exposure to a localized cooling zone.

11. The process of claim 9 in which gases within the containment structure are selectively passed through the evaporator of the refrigeration system.

12. The process of claim 9 in which the cooling medium passed through the condenser is used for co-generation.

13. The process of claim 9 in which a combustion process is conducted in an enclosed space within the containment structure and is isolated from the atmosphere within the containment structure.

14. The process of claim 9 in which heat is removed from the containment structure by introduction into the generator and by transfer to chilled refrigerant in the evaporator.

15. Pollution control apparatus for industrial processing equipment which generates large quantities of heated gases carrying pollutants which apparatus comprises:
(a) a containment structure comprising a plurality of conduits which containment structure encloses the processing equipment and which includes a barrier interposed between the processing equipment and the atmosphere,
(b) gas cleaning apparatus having an intake and a discharge within the structure, and
(c) an absorption refrigeration system having
 (i) a generator in heat exchange relationship with hot gases within the structure and activated by heat generated by the processing equipment,
 (ii) a condenser positioned in heat exchange relationship with a medium outside the structure,
 (iii) an evaporator comprising said plurality of conduits positioned in heat exchange relationship with the atmosphere within the containment structure.

* * * * *

UNITED STATES PATENT AND TRADEMARK OFFICE
CERTIFICATE OF CORRECTION

PATENT NO. : 5,355,696
DATED : October 18, 1994
INVENTOR(S) : Aubrey C. Briggs

It is certified that error appears in the above-indentified patent and that said Letters Patent is hereby corrected as shown below:

Column 3, line 43, "tile" should be -- the --.

Column 4, line 5, "n" should be -- in --.

Column 8, line 8, after "conduits", -- , -- should be inserted.

Signed and Sealed this

Twenty-eight Day of February, 1995

Attest:

BRUCE LEHMAN

*Attesting Officer*      *Commissioner of Patents and Trademarks*